United States Patent
Chen et al.

(10) Patent No.: US 9,342,759 B1
(45) Date of Patent: May 17, 2016

(54) OBJECT RECOGNITION CONSISTENCY IMPROVEMENT USING A PSEUDO-TRACKLET APPROACH

(71) Applicant: HRL Laboratories, LLC, Malibu, CA (US)

(72) Inventors: Yang Chen, Westlake Village, CA (US); Changsoo S. Jeong, Rancho Palos, CA (US); Deepak Khosla, Camarillo, CA (US); Kyungnam Kim, Oak Park, CA (US); Shinko Y. Cheng, Cupertino, CA (US); Lei Zhang, Torrance, CA (US); Alexander L. Honda, Sunnyvale, CA (US)

(73) Assignee: HRL Laboratories, LLC, Malibu, CA (US)

( * ) Notice: Subject to any disclaimer, the term of this patent is extended or adjusted under 35 U.S.C. 154(b) by 67 days.

(21) Appl. No.: 14/204,384

(22) Filed: Mar. 11, 2014

Related U.S. Application Data (60) Provisional application No. 61/785,203, filed on Mar. 14, 2013.

(51) Int. Cl.
*G06K 9/62* (2006.01)
(52) U.S. Cl.
CPC .................... *G06K 9/6262* (2013.01)
(58) Field of Classification Search
None
See application file for complete search history.

(56) References Cited

U.S. PATENT DOCUMENTS

| | | | |
|---|---|---|---|
| 9,070,020 B2 * | 6/2015 | Bobbitt | G06K 9/00718 |
| 2006/0215017 A1 * | 9/2006 | Cohen | H04N 7/148 |
| | | | 348/14.16 |
| 2008/0193010 A1 * | 8/2008 | Eaton | G06K 9/00771 |
| | | | 382/159 |

(Continued)

OTHER PUBLICATIONS

Yang Chen, Deepak Khosla, David Huber, Kyungnam Kim, and Shinko Y. Cheng, "A Neuromorphic Approach to Object Detection and Recognition in Airborne Videos with Stabilization," Int. Symposium on Vision Computing (ISVC'11), Las Vegas, Sep. 2011.

(Continued)

*Primary Examiner* — Aaron W Carter
*Assistant Examiner* — Narek Zohrabyan
(74) *Attorney, Agent, or Firm* — Tope-McKay & Associates (57) ABSTRACT

Described is a system for improving object recognition. Object detection results and classification results for a sequence of image frames are received as input. Each object detection result is represented by a detection box and each classification result is represented by an object label corresponding to the object detection result. A pseudo-tracklet is formed by linking object detection results representing the same object in consecutive image frames. The system determines whether there are any inconsistent object labels or missing object detection results in the pseudo-tracklet. Finally, the object detection results and the classification results are improved by correcting any inconsistent object labels and missing object detection results.

18 Claims, 9 Drawing Sheets

(56) References Cited

U.S. PATENT DOCUMENTS

| | | | | |
|---|---|---|---|---|
| 2009/0169053 A1* | 7/2009 | Vendrig | ............... | G06K 9/32 382/103 |
| 2011/0216964 A1* | 9/2011 | Ma et al. | ............... | 382/159 |
| 2011/0249867 A1* | 10/2011 | Haas et al. | ............... | 382/103 |
| 2012/0002843 A1* | 1/2012 | Yoda | ............... | A61B 5/1103 382/103 |
| 2012/0148093 A1* | 6/2012 | Sharma | ............... | 382/103 |
| 2013/0236058 A1* | 9/2013 | Wang | ............... | G06K 9/00771 382/103 |
| 2014/0098989 A1* | 4/2014 | Datta et al. | ............... | 382/103 |
| 2014/0185925 A1* | 7/2014 | Datta et al. | ............... | 382/159 |
| 2014/0205141 A1* | 7/2014 | Gao et al. | ............... | 382/103 |
| 2014/0369555 A1* | 12/2014 | Zhong et al. | ............... | 382/103 |
| 2015/0139607 A1* | 5/2015 | Grunberg et al. | ............... | 386/230 |
| 2015/0178930 A1* | 6/2015 | Gao et al. | ............... | G06T 7/0044 |
| 2015/0178931 A1* | 6/2015 | Gao et al. | ............... | G06T 7/0048 |

OTHER PUBLICATIONS

Khosla et al., A Neuromorphic System for Multi-Object Detection and Classification, Proc. SPIE 8745, Signal Processing, Sensor Fusion, and Target Recognition, XXII:87450X, May 23, 2013.

* cited by examiner

OBJECT RECOGNITION CONSISTENCY IMPROVEMENT USING A PSEUDO-TRACKLET APPROACH

GOVERNMENT LICENSE RIGHTS

This invention was made with government support under U.S. Government Contract Number HR0011-10-C-0033 Neovision2. The government has certain rights in the invention.

CROSS-REFERENCE TO RELATED APPLICATIONS

This is a Non-Provisional patent application of U.S. Provisional Application No. 61/785,203, filed in the United States on Mar. 14, 2013, entitled, "Object Recognition Consistency Improvement Using a Fast and Simple Pseudo-Tracklet Approach."

BACKGROUND OF THE INVENTION (1) Field of Invention

The present invention relates to a system for improving the performance of a video object recognition system and, more particularly, to a system for improving the performance of a video object recognition system using a pseudo-tracklet approach.

(2) Description of Related Art

In previous bio-inspired video-based object recognition systems, locations in video images containing potential objects of interests (moving or stationary) are first detected using a bio-inspired detection approach, such as visual saliency, and then the regions of interest (ROI) around the detections are passed to a recognition engine. In this type of system, there is no tracking front-end for detection, which greatly reduces system complexity, but also puts much more burden on the recognition engine for accurate classification of objects over time. As a result, the recognition system output for a single object in the scene can fluctuate from frame to frame, sometimes giving erroneous classifications for the object or missing the object entirely if the detection system fails, resulting in poor system recognition performance.

The method described above exhibits limitations that make it incomplete. Thus, a continuing need exists for a system for improving the overall system performance of an object recognition system without a full-featured front-end tracking system, background clutter, and ambiguous classification resulting from imperfect classifier training.

SUMMARY OF THE INVENTION

The present invention relates to system for improving the performance of a video object recognition system and, more particularly, to a system for improving the performance of a video object recognition system using a pseudo-tracklet approach. The system comprises one or more processors and a memory having instructions such that when the instructions are executed, the one or more processors perform multiple operations. Object detection results and classification results for a sequence of image frames are received as input. Each object detection result is represented by a detection box, and each classification result is represented by an object label corresponding to the object detection result. A pseudo-tracklet is formed by linking object detection results representing the same object in consecutive image frames. The system then determines whether there are any inconsistent object labels or missing object detection results in the pseudo-tracklet. Finally, the object detection results and the classification results are improved by correcting any inconsistent object labels and missing object detection results.

In another aspect, the system selects an object detection result B from a current image frame. An object detection result B' in a previous image frame that is closest to the object detection result in the current image frame is found. A correlation between the object detection result B and the object detection result B' is calculated. A match is determined if the calculated correlation exceeds a predetermined threshold.

In another aspect, when a match is determined, the system adds the object detection result B to the pseudo-tracklet comprising the object detection result B' if the object detection result B' belongs to a pseudo-tracklet. A new pseudo-tracklet with the object detection result B and the object detection result B' is formed if the object detection result B' does not belong to a pseudo-tracklet.

In another aspect, the system determines whether a pseudo-tracklet has consistent object labels according to the following:

$$(n_{L_0}/N) > P,$$

where $n_{L_0}$ is a number of object detection results in the pseudo-tracklet having the same majority label $L_0$ as the first object detection result and the last object detection result in the pseudo-tracklet, N is the length of the pseudo-tracklet, and P is a threshold parameter.

In another aspect, inconsistent object labels are corrected by changing the inconsistent object labels to the majority label $L_0$.

In another aspect, a new detection box is created at the image frame where an object detection result is missing. An object label is assigned for the missing object detection result that is the same as the majority label $L_0$.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for improving the performance of a video object recognition system and, more particularly, to a system for improving the performance of a video object recognition system using a pseudo-tracklet approach. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction.

Instead, they are used to reflect relative locations and/or directions between various portions of an object. As such, as the present invention is changed, the above labels may change their orientation.

(1) Principal Aspects

The present invention has three "principal" aspects. The first is a system for improving the performance of a video object recognition system using a pseudo-tracklet approach. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for improving the performance of a video object recognition system using a pseudo-tracklet approach. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Introduction

The present invention describes a method for improving the system performance of a video object recognition system using a simple pseudo-tracklet approach. At the heart of this method is using the recognition system's raw output to construct "pseudo-tracklets", correct possible system recognition mistakes in the pseudo-tracklets, and fill in missing detections. The entire process can be performed as a "post-processing" step after the main functions of the recognition system have all been finished. With the use of the present invention, the overall system performance can be greatly improved without involving a full-featured front-end tracking system, especially in a situation having a lot of noise, background clutter, and ambiguous classification resulting from imperfect classifier training. Compared with a traditional moving object recognition system that employs front-end tracker, the system described herein is much simpler to design, is easier to implement, and can achieve better performance since the system is capable of recognition of both moving and stationary targets.

One of the features of the present invention is the robustness of the performance of the approach such that when the pseudo-tracklet is formed and errors in classification and/or detection are corrected within the pseudo-tracklet, the pseudo-tracklet will be correct with high probability with respect to the underlying real-world events. This robustness is ensured by designing various checks and procedures to render robust decisions and avoid ambiguous situations. As a result, the detection and classification results after the pseudo-tracklet processing will be improved compared with the original input in the majority of situations. Additionally, the detection and classification results will not suffer any loss even for cases with much ambiguity and conflict in the input, since the pseudo-tracklet system will simply not change the results in those cases.

(3) Specific Details

Figure 1:
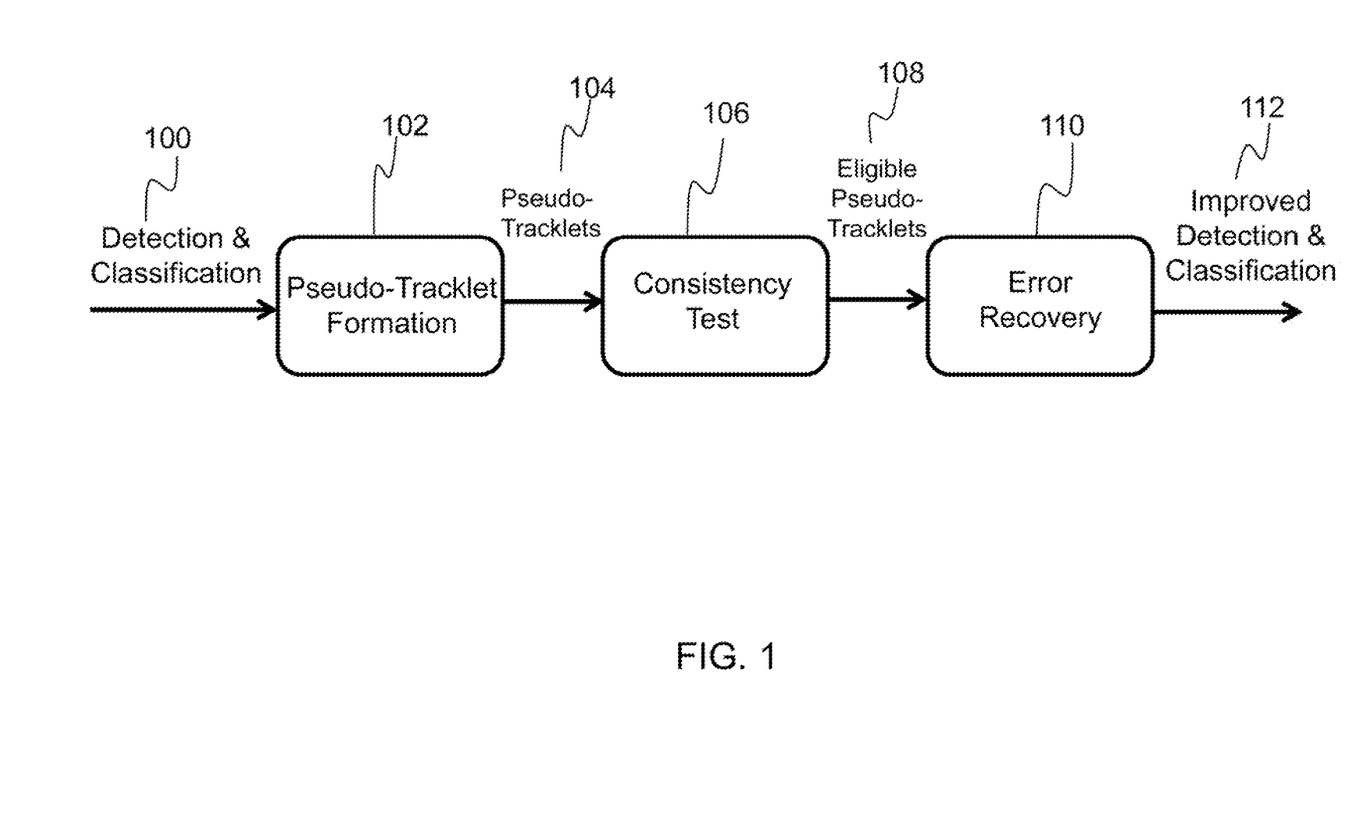
FIG. 1 is a flow diagram of the pseudo-tracklet system according to the principles of the present invention.

FIG. 1 illustrates a block diagram of the pseudo-tracklet system. The input to the system according to the principles of the present invention is a set of detection and classification results 100 from a recognition process. The detection and classification results 100 are represented on a frame-by-frame basis for the input images from the input video to the system. For each input image frame, the detections and their classifications are organized in a list. Each item in the list represents the detection and classification of a potential object of interest in the image. Detections are usually represented by a bounding (e.g., rectangular) box, whereas the classification is usually represented by a vector of numerical confidence values corresponding to a set of predefined labels of object classes of interest. For example, a detection box can be represented as (x, y, width, height), where (x, y) is the image coordinates of the center of the detection box, and width and height are the width and height of the box, respectively. A non-limiting example of classification for a detection is a vector {0.1, 0.8, 0.3, 0.2} that corresponds to the class names of {non-target, car, person, cyclist}, which signifies that the classification system has determined that the underlying object in the image is "non-target" with 0.1 confidence, a "car" with 0.8 confidence, a "person" with 0.3 confidence, and a "cyclist" with 0.2 of confidence, respectively. Since "car" has the largest confidence value among all possible classes, this detection is assigned a label of "car".

The goal of the pseudo-tracklet formation module 102 is to associate, or link, the detections of the same underlying object from a set of neighboring image frames. These associated detections form a "mini" track, hence the name pseudo-tracklet 104. The size of the neighborhood in terms of the number image frames is usually chosen to be fairly small so as to keep the subsequent decision process simple and robust.

A consistency test module 106 performs tests to determine if the classification results in each pseudo-tracklet 104 are in a state in which one can recover from potential misclassification and/or missed detections with high confidence to generate eligible pseudo-tracklets 108. If such tests pass, then an error recovery module 110 is carried out. The error recovery module 110 tries to recover any misclassifications and/or missed detections within each pseudo-tracklet using the information from the set of consistent classifications, resulting in improved detection and classification 112.

Both the pseudo-tracklet formation module 102 and the consistency test module 106 are designed to perform in a way that the results from the error recovery module 110 have a very high probability of being correct. As a result, if the input detection and classification results 100 are uncertain and conflicting, the entire pseudo-tracklet processing will do no harm to the system output.

(3.1) Patch Matching

Before introducing the pseudo-tracklet concept, the basic operation in pseudo-tracklet formation, patch matching, is first described. For a detection in a current image frame, patch matching refers to finding the closest matching detection from the previous image frames using a predetermined metric. As a non-limiting example, the metric can be normalized cross-correlation, or any suitable metric for the images at hand, such as sum of squared difference (SSD). For the purposes of the invention described herein, cross-correlation was used (hereinafter referred to as correlation).

Using a correlation score as the metric, patch matching can be mathematically expressed as finding a pairing $T_j^i$ as defined by:

$$T_j^i = \left\{ B_j^i, B_k^{i-1} \mid \max_k (\text{corr}(B_j^i, B_k^{i-1})) > Th, k = 1, \ldots, m \right\}, j = 1, \ldots n \quad (1)$$

where $B_j^i$ is the j-th detection in frame i, corr( ) is the cross-correlation function, Th is the correlation threshold, and n and m are a number of detections in frames i and i−1, respectively. Correlation of the two detection boxes can be calculated as the maximum of the normalized correlation coefficients between the two two-dimensional (2D) regions in the images corresponding to the two detection boxes. Th is typically set to 0.9.

Equation (1) above represents an exhaustive search approach to patch matching that gives the maximum correlation. In practice, one can use a number of heuristics to speed up the matching process without searching all candidates exhaustively. For each detection B in the current frame i, one can first find the detection in the previous frame i−1 that is the closest in distance (in Euclidian sense) to the detection in frame i. If the correlation between the detection in the current frame and the previous frame is above a certain threshold, Th, a match is found. Otherwise, the system attempts to match the detection with all the remaining detections in the previous frame. If the correlation for the detection with the maximum correlation score exceeds the threshold Th, then that detection is the match for detection B. This two-step approach is equivalent to an exhaustive search, but can significantly speed up the patch matching process. This is often useful in a case where the objects or camera move slowly so the location of an object does not change much in consecutive image frames.

Figure 2:
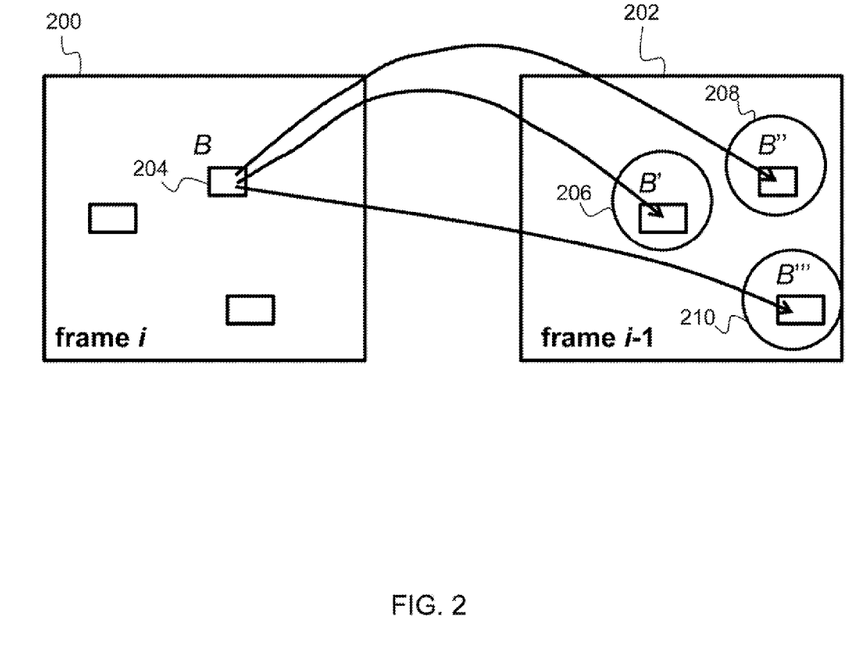
FIG. 2 is an illustration of patch matching by correlation between frames according to the principles of the present invention.

Furthermore, another rule is imposed to ensure high confidence and unambiguous matching. If there is more than one candidate detection in the previous frame that exceeds the correlation threshold Th, then the candidate detection with the maximum correlation must exceed a predetermined value, for example 1.2 times the correlation of the next best detection to be accepted as a match. FIG. 2 illustrates the patch matching process by correlation from two consecutive frames, frame i 200 and frame i−1 202. Patch matching for a detection B 204 in frame i 200 starts with the detection B' 206 from the previous frame (frame i−1 202) that is closest to detection B 204 (in Euclidian distance between the centers of the detections) in consideration. If they match, the process stops. Otherwise, matching is attempted with all remaining detections in the previous frame, such as B" 206 and B" 208.

Figure 3:
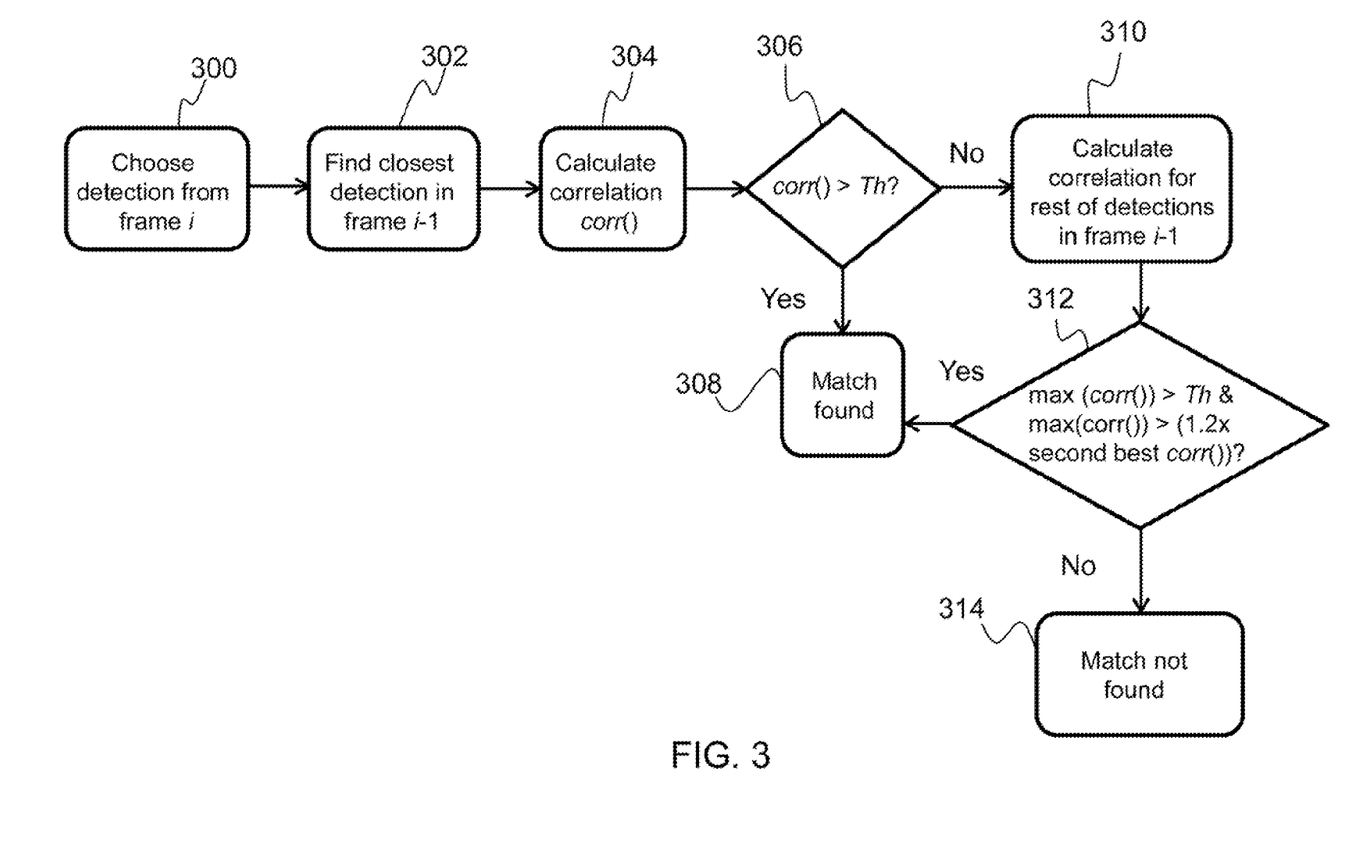
FIG. 3 is a flow diagram of patch matching using correlation according to the principles of the present invention.

FIG. 3 is a flow diagram showing the entire patch matching process. In a first step 300, a detection is chosen from a frame i. In a second step 302, the system finds the closest detection in frame i−1. In a third step 304, correlation (corr( ) of the two detections is calculated. In a fourth step 306, a determination is made with regards to whether the calculated correlation is greater than a predetermined correlation threshold (Th). If the correlation is greater than the correlation threshold, then the system determines that a match is found 308. If it is determined that the calculated correlation is not greater than the correlation threshold, then the system calculates correlations for the rest of the detections in frame i−1 in a fifth step 310 of the process. In a sixth step 312, a determination is made regarding whether the correlation for the detection with the maximum correlation score (i.e., max(corr( )) exceeds the threshold Th, and whether the candidate detection with the maximum correlation is 1.2 times (for example) the correlation of the next best detection. If yes, then the system determines that a match is found 308. If not, then a match is not found 314.

(3.2) Pseudo-Tracklet Formation

When a detection B in the current frame finds a match B' in the previous frame, the detection B is added to the pseudo-tracklet that B' belongs to. If B' does not belong to any pseudo-tracklet, a new pseudo-tracklet is formed with B and B' as the initial detections. If there is no match found for B, B is left alone for further processing (described below), and the process moves on to other detections in the current frame until all detections in the current frame are processed.

At this point if there are remaining detections in frame i that do not have a match in the previous frame i–1, one of several possibilities could have happened. If all of the pseudo-tracklets for the previous frame have a matching detection in the current frame, then the remaining detections could indicate the start of a new pseudo-tracklet (i.e., newly appearing objects in the image). In this situation, the detections will be allowed to be matched in the next frame.

Another possibility is that there are pseudo-tracklets extending to frame i–2, but not i–1. That is, some of the pseudo-tracklets have missing detections in frame i–1. Therefore, the system needs to look at frame i–2, and try to find a match using the same process as is done for frame i–1 to bridge the gap. The difference here is that, whereas a match can happen to any detection in frame i–1, for frame i–2, the only detections that are considered are those that either do not belong to any pseudo-tracklets or belong to a pseudo-tracklet that does not have detections from frames i–1 and i. If a match is found in this situation, it will become a candidate later for the recovery of missed detections (i.e., error recovery; FIG. 1, 110).

Figure 4:
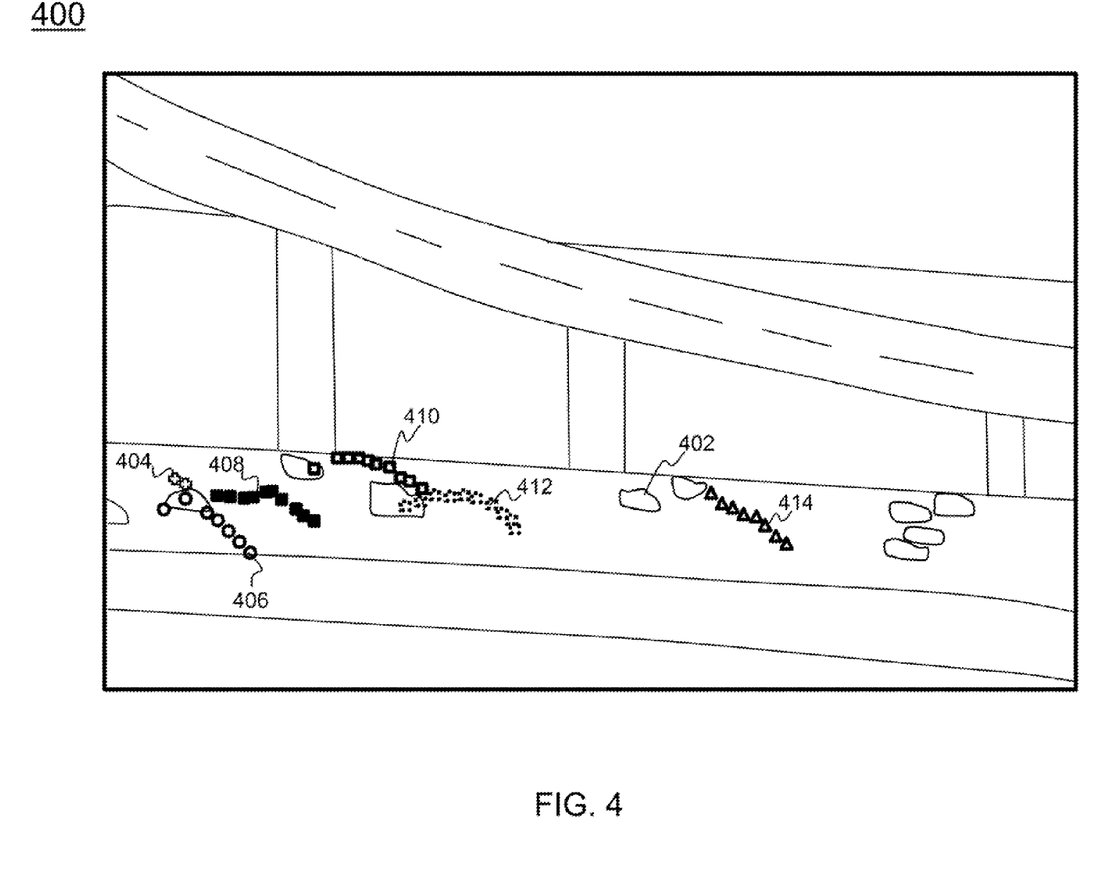
FIG. 4 is an illustration of a scene with pseudo-tracklets formed from patch matching according to the principles of the present invention.

FIG. 4 illustrates a non-limiting example of a scene 400 of moving vehicles 402 with pseudo-tracklets formed from patch matching. A series of shapes (e.g., crosses 404, circles 406, filled in squares 408, open squares 410, dashed squares 412, and triangles 414) having the same line or fill pattern represent the detections from the same object (e.g., vehicle 402), which form a pseudo-tracklet. The illustrated sequence was captured with a moving camera on an aerial platform above a freeway. These results show that the pseudo-tracklet approach produces robust object detection associations using only simple patch matching of detection boxes.

(3.2) Consistency Test

Once a pseudo-tracklet reaches a certain length N, the system according to the principles of the present invention applies error correction (i.e., error recovery; FIG. 1, 110) to misclassified and/or missed detections. A consistency test (FIG. 1, 106) is carried out to ensure robust error correction. In a consistency test with N detections in a pseudo-tracklet, the present invention is used to check how many of the detections have the same label. The "label" of a detection is the class name having the largest classification confidence value. Consistency is measured as follows. A pseudo-tracklet is said to have consistent labels if the following holds:

$$(n_{L_0}/N) > P, \qquad (2)$$

where $n_{L_0}$ is the number of detections in the pseudo-tracklet having the same majority label $L_0$ as the first and the last detection (the first and last detections must have the same label), N is the length of the pseudo-tracklet, and P is a threshold parameter. Therefore, if the labels of the first and the last detections in a pseudo-tracklet are the same, and the number of detections with the same labels as the first and last detections out of total N detections is greater than a threshold value P, then the pseudo-tracklet is considered to have passed the consistency test, and error recovery can be carried out. Otherwise, error recovery will not be carried out.

Pseudo-tracklet length N and threshold P are set to proper values based on input data characteristics and to ensure the robustness of the majority label. In one aspect of the present invention, N=5 and P=0.6 were used. Therefore, if three out of five labels (including the first and the last detections) are consistent, the pseudo-tracklet approach will change the other two possible inconsistently labeled detections to have the same label as the other three detections.

(3.3) Error Recovery

Error recovery takes one of two forms: correction of inconsistent labels or correction of missed detections. If a pseudo-tracklet passes the consistency test, one can correct any inconsistent detection labels by changing their labels to the same as the majority label $L_0$. For example, suppose one has a pseudo-tracklet spanning five image frames with the current label set, {car, car, car, truck, car), and corresponding class confidence values (0.8, 0.8, 0.7, 0.5, 0.9}. The majority label $L_0$ is the same as the labels for the first and the last detections in a pseudo-tracklet (car, in this example). To change the label of a detection, the class confidence values of the inconsistently labeled detections (truck, in this example) are modified by taking the average of the confidence values class-wise over all detections in the pseudo-tracklet having the majority label $L_0$, and assigning it to the inconsistently labeled detections. In the example above, the average confidence value of the majority label is (0.8+0.8+0.7+0.9)/4=0.8. Therefore, the final pseudo-tracklet after error recovery would be {car, car, car, truck, car}, with confidence values {0.8, 0.8, 0.7, 0.8, 0.9}.

In the case of missed detections (i.e., there is no detection in a pseudo-tracklet from a certain frame), the present invention treats them as though they are mislabeled (i.e., their labels are different than the majority label) and corrects them using the same approach as for mislabeled detections described above. In addition, a new detection box (x, y, width, height) is created at the frame(s) where the detection(s) is missing by interpolating the locations for (x, y) and averaging the sizes for width and height of other detections having the majority label.

Figure 5:
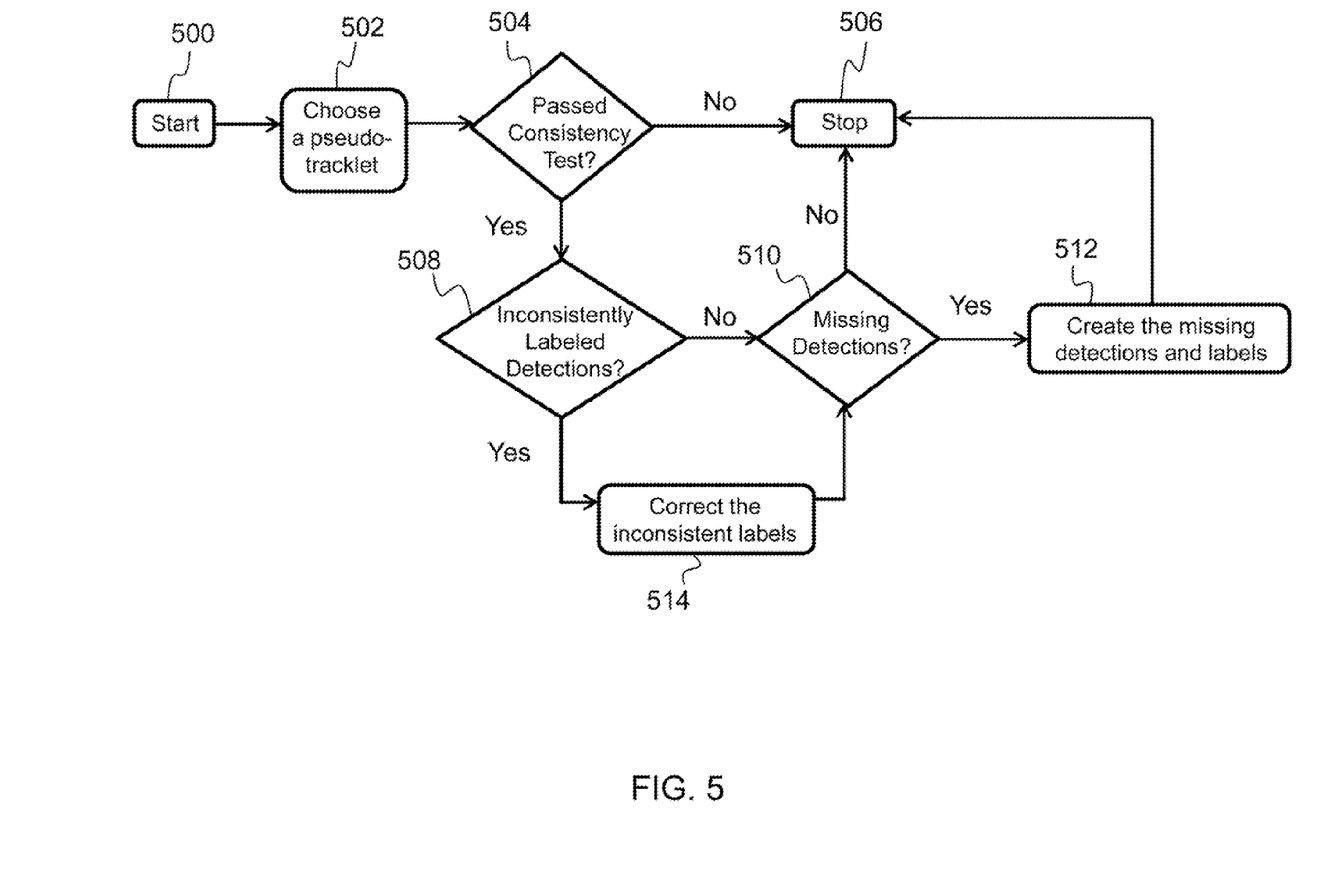
FIG. 5 is a flow diagram of the consistency test module and the error recovery module according to the principles of the present invention.

FIG. 5 is a flow diagram of the process of taking a pseudo-tracklet through the consistency test and the correction for mislabeled and missed detections (i.e., error recovery). The process starts 500 and then in a first step 502, a pseudo-tracklet is chosen. In a second step 504, a determination is made regarding whether the chosen pseudo-tracklet passed the consistency test. If no, the process stops 506. If yes, then the system determines, in a third step 508, if there are any inconsistently labeled detections. If there are not, then in a fourth step 510, a determination is made regarding whether there are any missed detections. If not, the process stops 506. If there are missing detections, in a fifth step 512, labels are created for the missing detections. From there, the process stops 506. If there are inconsistently labeled detections, then the inconsistent labels are corrected in a sixth step 514. From there, the process continues back to determining if there are any missing detections in the fourth step 510.

Figure 6:
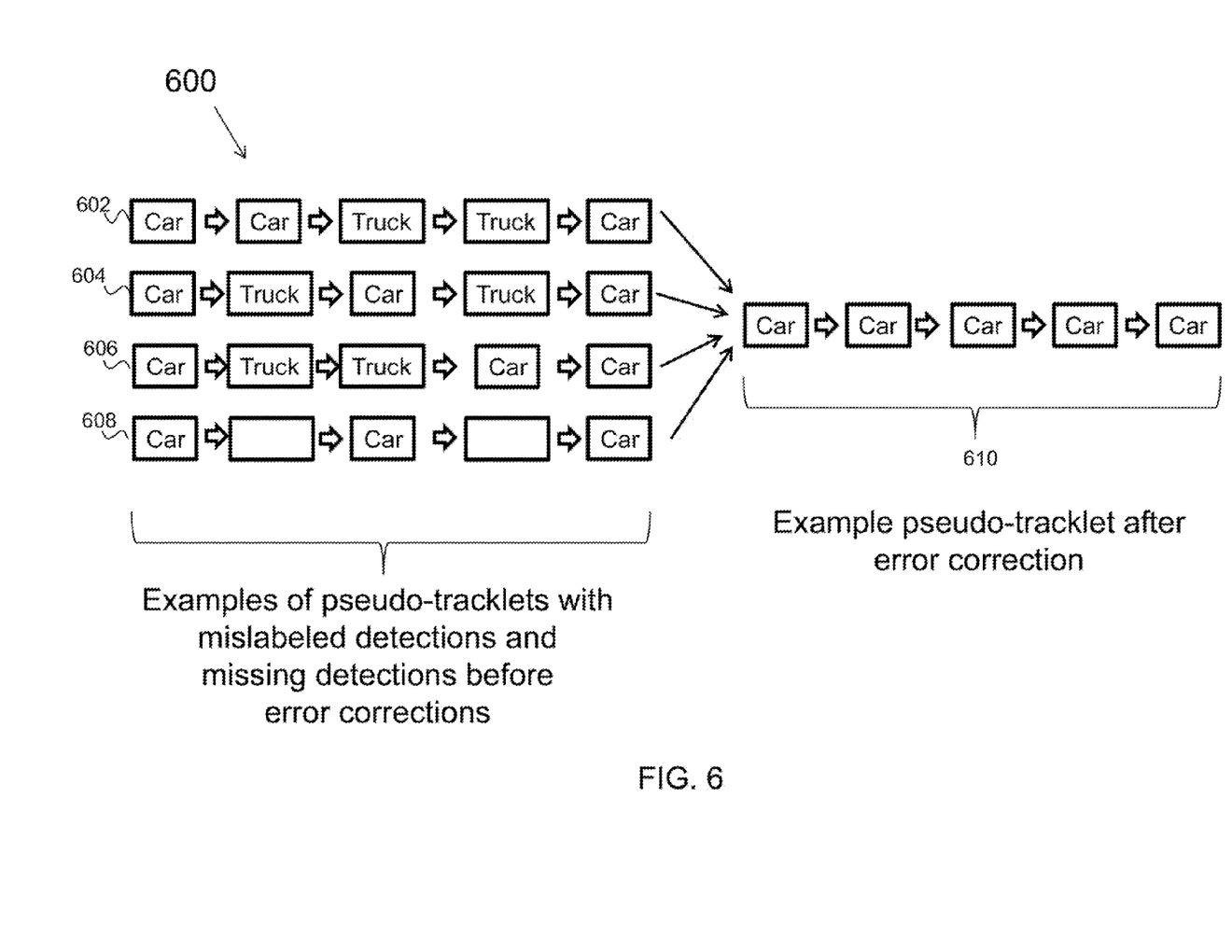
FIG. 6 is an illustration of error correction using the pseudo-tracklet system according to the principles of the present invention.

FIG. 6 shows several examples of how the error correction works including mislabeled detections as well as missing detections. An example set of pseudo-tracklets 600 with mislabeled detections and missing detections is shown before error corrections. Some of the pseudo-tracklets (602, 604, 606, and 608) include mislabeled detections, as indicated by having a different label (e.g., truck) than the first and last detections in the pseudo-tracklet. One pseudo-tracklet 610 is missing two detections (indicated by two empty rectangles). As described above, the system corrects the mislabeled detection and missing detections by changing their labels to the same as the majority label (i.e., same as the labels for the first and the last detections in a pseudo-tracklet) to generate a corrected pseudo-tracklet 610, with all detections having the same label. In fact, if only one out of five labels is not consistent or is missing, the inconsistent or missing label will also be recovered using the same error recovery procedure outlined above.

(3.4) Experimental Studies

The method described above for using pseudo-tracklets to correct classification and detection errors has been implemented and tested. In the system implementation, the detector front-end (without a tracker) employs a saliency based object detection method, and the recognition engine is one based on convolutional neural networks (CNN). Khosla et provides a description of saliency based object detection and CNN-based classification in "A Neuromorphic System for Multi-Object Detection and Classification", Proc. SPIE 8745, Signal Processing, Sensor Fusion, and Target Recognition, XXII:87450X, May 23, 2013, which is hereby incorporated by reference as though fully set forth herein.

For each input image frame of a video sequence, the detector front-end generates a list of candidate regions with potential target objects of interest, each of which is denoted by the center coordinates (x, y) and width and height of the region. A pre-trained classification engine based on CNN takes the cue of (x, y, width, height) and computes a classification result as a vector of confidence values which is interpreted as the likelihood of the image at (x, y, width, height) is of one of the predefined object classes. After the entire sequence of video is processed, one can then compare the system output with the known ground truth (provided by an image analyst and believed to be 100% correct), to measure the performance of the recognition system.

Figure 7:
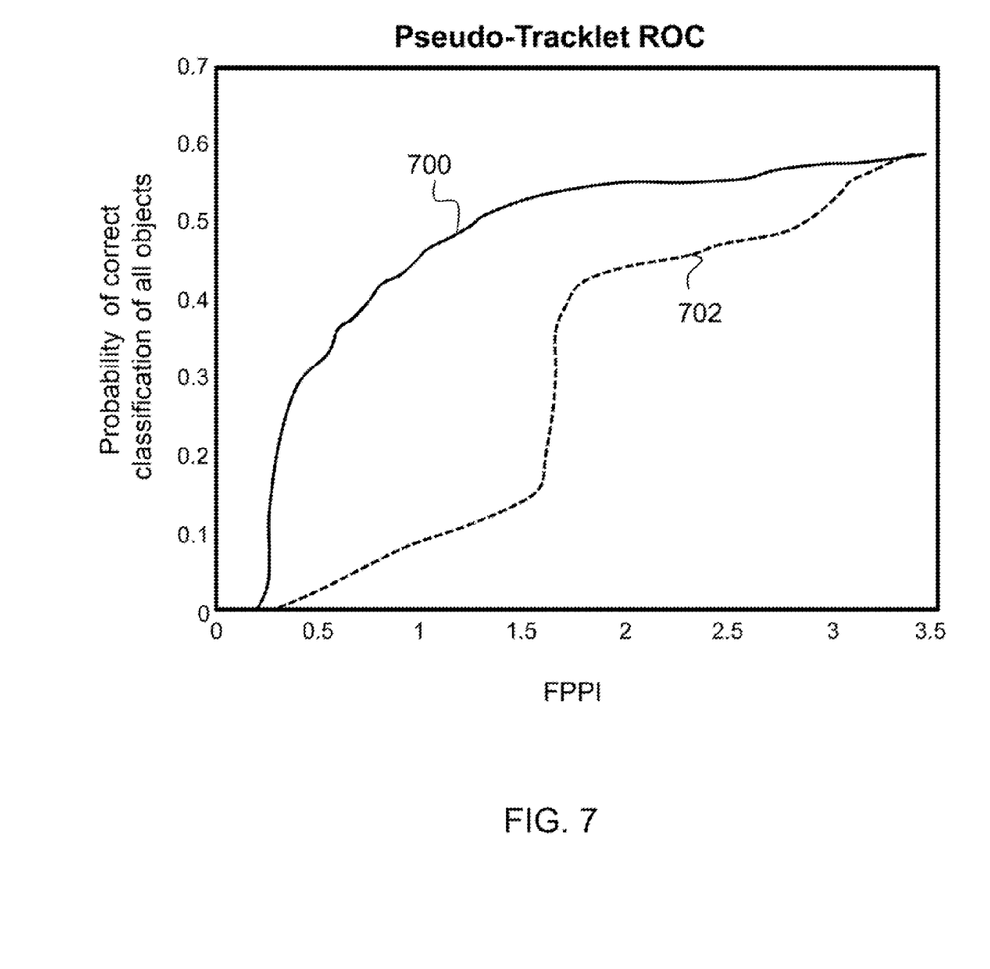
FIG. 7 is a receiver operating characteristic (ROC) plot showing improvement of object recognition system performance after classification error correction using the pseudo-tracklet system according to the principles of the present invention.

A receiver operating characteristic (ROC) curve is typically used for this purpose. ROCs were generated for both the original system output as well as the output processed through the pseudo-tracklet system described in the present invention. FIG. 7 shows the ROC curves with (solid curve 700) and without (dashed curve 702) the pseudo-tracklet processing. A ROC curve achieves better performance if it is closer to the left and top of the graph. In FIG. 7, the horizontal axis shows average false positive per image (FPPI) over the entire sequence, whereas the vertical axis shows the overall probability of correct object classification of all classes.

The input recognition results were obtained from a video sequence from a stationary camera platform. There were many instances of "person" and "cyclist" in this sequence in addition to "bus", "car" and "truck". Due to appearance similarity of "person" and "cyclist" classes, there were many fluctuations in classification results for cyclist and person objects. In this situation, the pseudo-tracklet system described in the present invention successfully recovered many of these recognition errors and improved the overall object recognition results, as shown by the ROC curves, which show improvement of object recognition system performance after classification error correction using the pseudo-tracklet approach (solid curve 700) compared with the results without using the pseudo-tracklet approach (dashed curve 702).

Figure 8:
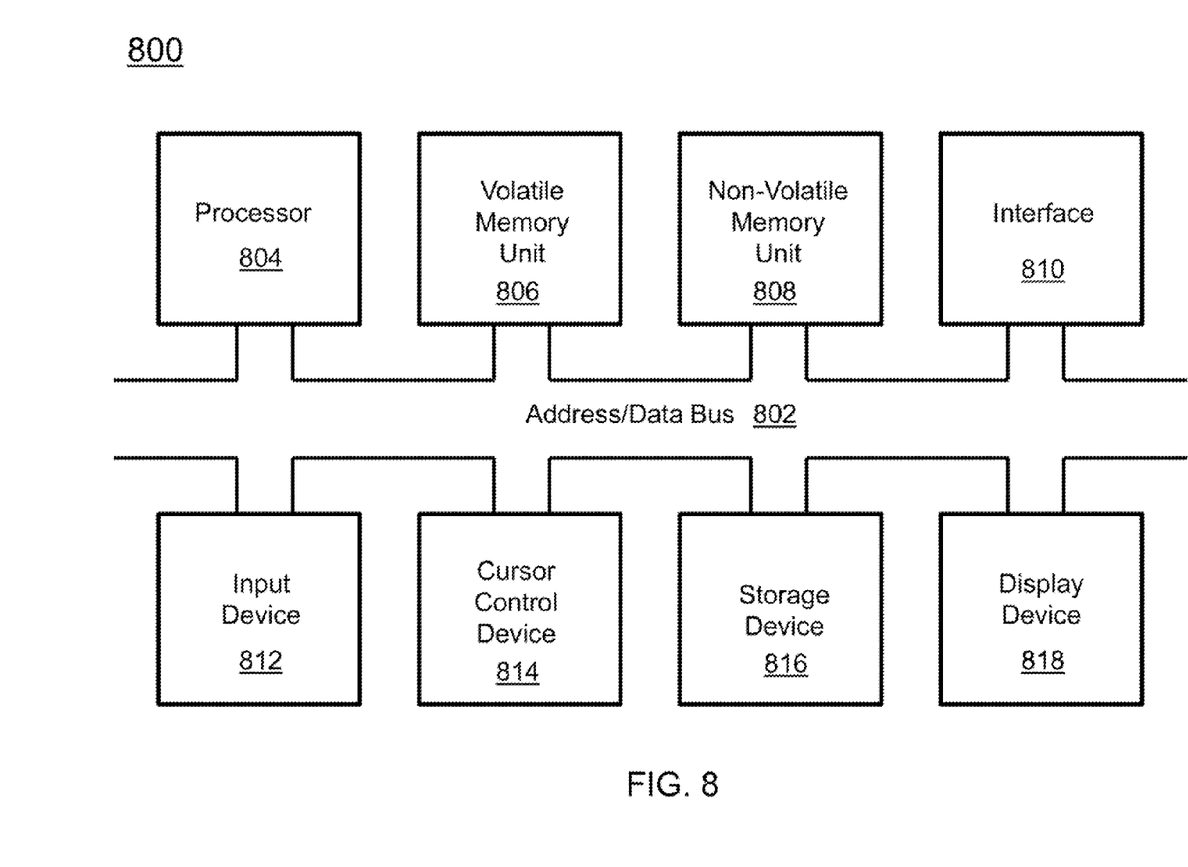
FIG. 8 is an illustration of a data processing system according to the principles of the present invention.

An example of a computer system 800 in accordance with one aspect is shown in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 800 may include an address/data bus 802 that is configured to communicate information. Additionally, one or more data processing units, such as a processor 804, are coupled with the address/data bus 802. The processor 804 is configured to process information and instructions. In one aspect, the processor 804 is a microprocessor. Alternatively, the processor 804 may be a different type of processor such as a parallel processor, or a field programmable gate array.

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an embodiment, the computer system 800 also may include one or more interfaces, such as an interface 810, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alpha-numeric input device, such as a keyboard, that may include alphanumeric and/or function keys. Alternatively, the input device 812 may be an input device other than an alphanumeric input device. In one aspect, the computer system 800 may include a cursor control device 814 coupled with the address/data bus 802, wherein the cursor control device 814 is configured to communicate user input information and/or command selections to the processor 800. In one aspect, the cursor control device 814 is implemented using a device such as a mouse, a track-ball, a track-pad, an optical tracking device, or a touch screen. The foregoing notwithstanding, in one aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In one aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In one aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with one aspect. However, the non-limiting example of the computer system 800 is not strictly limited to being a computer system. For example, one aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
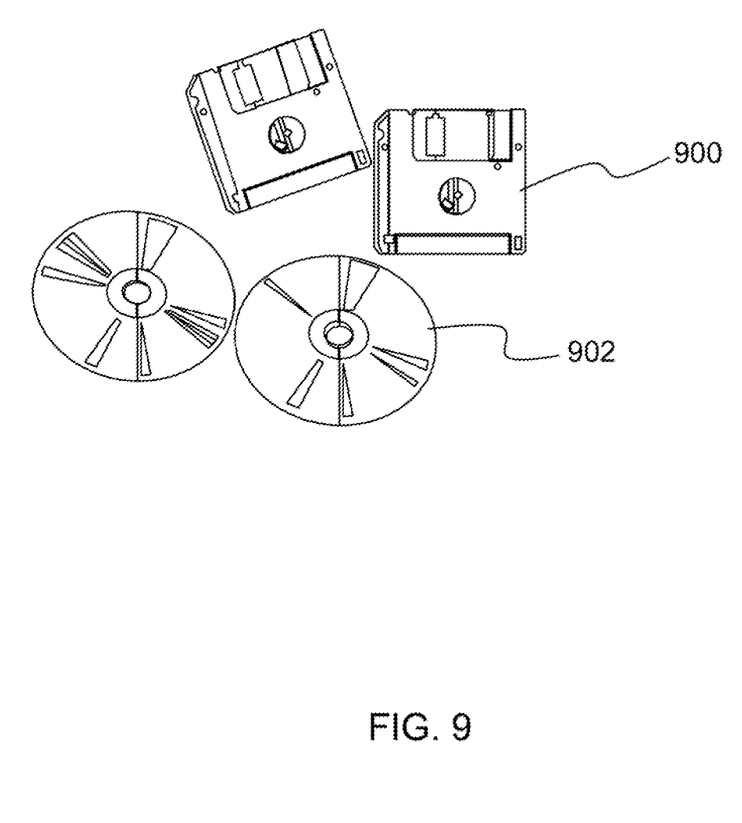
FIG. 9 is an illustration of a computer program product according to the principles of the present invention.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents computer readable code (i.e., instruction means or instructions) stored on any compatible non-transitory computer readable medium.

What is claimed is:

1. A system for object recognition improvement, the system comprising:
one or more processors and a non-transitory computer-readable medium having executable instructions encoded thereon such that when the instructions are executed, the one or more processors perform operations of:
receiving object detection results and classification results for a sequence of image frames as input, wherein each object detection result is represented by a detection box and each classification result is represented by an object label corresponding to the object detection result;
forming a pseudo-tracklet by linking object detection results representing the same object in consecutive image frames;
determining whether there is at least one of an inconsistent object label and a missing object detection result in the pseudo-tracklet; and
improving the object detection results and the classification results by correcting the at least one inconsistent object label and missing object detection result.

2. The system as set forth in claim 1, wherein the one or more processors further perform operations of:
selecting an object detection result B from a current image frame;
finding an object detection result B' in a previous image frame that is closest to the object detection result in the current image frame;
calculating a correlation between the object detection result B and the object detection result B'; and
determining a match if the calculated correlation exceeds a predetermined threshold.

3. The system as set forth in claim 2, wherein when a match is determined, the one or more processors further perform an operation of:
adding the object detection result B to the pseudo-tracklet comprising the object detection result B' if the object detection result B' belongs to a pseudo-tracklet; or
forming a new pseudo-tracklet with the object detection result B and the object detection result B' if the object detection result B' does not belong to a pseudo-tracklet.

4. The system as set forth in claim 3, wherein the one or more processors further perform an operation of determining whether a pseudo-tracklet has consistent object labels according to the following:

$$(n_{L_0}/N) > P,$$

where $n_{L_0}$ is a number of object detection results in the pseudo-tracklet having the same majority label $L_0$ as the first object detection result and the last object detection result in the pseudo-tracklet, N is the length of the pseudo-tracklet, and P is a threshold parameter.

5. The system as set forth in claim 4, wherein the one or more processors further perform an operation of correcting inconsistent object labels by changing the inconsistent object labels to the majority label $L_0$.

6. The system as set forth in claim 5, wherein the one or more processors further perform operations of:
creating a new detection box at the image frame where an object detection result is missing; and
assigning an object label for the missing object detection result that is the same as the majority label $L_0$.

7. A computer-implemented method for object recognition improvement, comprising an act of:
causing one or more processors to execute instructions stored on a non-transitory memory such that upon execution, the one or more processors performs operations of:
receiving object detection results and classification results for a sequence of image frames as input, wherein each object detection result is represented by a detection box and each classification result is represented by an object label corresponding to the object detection result;
forming a pseudo-tracklet by linking object detection results representing the same object in consecutive image frames;
determining whether there is at least one of an inconsistent object label and a missing object detection result in the pseudo-tracklet; and
improving the object detection results and the classification results by correcting the at least one inconsistent object label and missing object detection result.

8. The method as set forth in claim 7, wherein the data processor further performs operations of:
selecting an object detection result B from a current image frame;
finding an object detection result B' in a previous image frame that is closest to the object detection result in the current image frame;
calculating a correlation between the object detection result B and the object detection result B'; and
determining a match if the calculated correlation exceeds a predetermined threshold.

9. The method as set forth in claim 8, wherein when a match is determined, the data processor further performs an operation of:
  adding the object detection result B to the pseudo-tracklet comprising the object detection result B' if the object detection result B' belongs to a pseudo-tracklet; or
  forming a new pseudo-tracklet with the object detection result B and the object detection result B' if the object detection result B' does not belong to a pseudo-tracklet.

10. The method as set forth in claim 9, wherein the data processor further performs an operation of:
  determining whether a pseudo-tracklet has consistent object labels according to the following:

$$(n_{L_0}/N) > P,$$

where $n_{L_0}$ is a number of object detection results in the pseudo-tracklet having the same majority label $L_0$ as the first object detection result and the last object detection result in the pseudo-tracklet, N is the length of the pseudo-tracklet, and P is a threshold parameter.

11. The method as set forth in claim 10, wherein the data processor further performs an operation of correcting inconsistent object labels by changing the inconsistent object labels to the majority label $L_0$.

12. The method as set forth in claim 11, wherein the data processor further performs operations of:
  creating a new detection box at the image frame where an object detection result is missing; and
  assigning an object label for the missing object detection result that is the same as the majority label $L_0$.

13. A computer program product for object recognition improvement, the computer program product comprising computer-readable instructions stored on a non-transitory computer-readable medium that are executable by a computer having a processor for causing the processor to perform operations of:
  receiving object detection results and classification results for a sequence of image frames as input, wherein each object detection result is represented by a detection box and each classification result is represented by an object label corresponding to the object detection result;
  forming a pseudo-tracklet by linking object detection results representing the same object in consecutive image frames;
  determining whether there is at least one of an inconsistent object label and a missing object detection result in the pseudo-tracklet; and
  improving the object detection results and the classification results by correcting the at least one inconsistent object label and missing object detection result.

14. The computer program product as set forth in claim 13, further comprising instructions for causing the processor to perform operations of:
  selecting an object detection result B from a current image frame;
  finding an object detection result B' in a previous image frame that is closest to the object detection result in the current image frame;
  calculating a correlation between the object detection result B and the object detection result B'; and
  determining a match if the calculated correlation exceeds a predetermined threshold.

15. The computer program product as set forth in claim 14, further comprising instructions, when a match is determined, for causing the processor to perform an operation of:
  adding the object detection result B to the pseudo-tracklet comprising the object detection result B' if the object detection result B' belongs to a pseudo-tracklet; or
  forming a new pseudo-tracklet with the object detection result B and the object detection result B' if the object detection result B' does not belong to a pseudo-tracklet.

16. The computer program product as set forth in claim 15, further comprising instructions for causing the processor to perform an operation of determining whether a pseudo-tracklet has consistent object labels according to the following:

$$(n_{L_0}/N) > P,$$

where $n_{L_0}$ is a number of object detection results in the pseudo-tracklet having the same majority label $L_0$ as the first object detection result and the last object detection result in the pseudo-tracklet, N is the length of the pseudo-tracklet, and P is a threshold parameter.

17. The computer program product as set forth in claim 16, further comprising instructions for causing the processor to perform an operation of correcting inconsistent object labels by changing the inconsistent object labels to the majority label $L_0$.

18. The computer program product as set forth in claim 17, further comprising instructions for causing the processor to perform operations of:
  creating a new detection box at the image frame where an object detection result is missing; and
  assigning an object label for the missing object detection result that is the same as the majority label $L_0$.

* * * * *